United States Patent [19]

Cline

[11] Patent Number: 4,610,066

[45] Date of Patent: Sep. 9, 1986

[54] APPARATUS FOR MOUNTING AND REMOVING A HUB FROM A SHAFT

[75] Inventor: William F. Cline, Rector, Pa.

[73] Assignee: Elliott Turbomachinery Co., Inc., Jeannette, Pa.

[21] Appl. No.: 610,735

[22] Filed: May 16, 1984

[51] Int. Cl.[4] .............................................. B23P 19/04
[52] U.S. Cl. ....................................... 29/252; 29/244
[58] Field of Search ................. 29/426.4, 426.5, 244, 29/252, 270, 426.6, 464, 466, 469, 426.1

[56] References Cited

U.S. PATENT DOCUMENTS

| | | | |
|---|---|---|---|
| 1,684,226 | 9/1928 | Johnson | 29/252 |
| 3,033,597 | 5/1962 | Miller | 29/252 X |
| 3,099,075 | 7/1963 | McDaniels, Jr. et al. | 29/252 X |
| 3,104,459 | 9/1963 | Wendt | 29/252 |

FOREIGN PATENT DOCUMENTS 990494  1/1983  U.S.S.R. ............................... 29/270

*Primary Examiner*—Howard N. Goldberg
*Assistant Examiner*—Joseph M. Gorski
*Attorney, Agent, or Firm*—Robert P. Hayter

[57] ABSTRACT

Apparatus for effecting the mounting and removal of a hub from a shaft is disclosed. The combination of a piston and cylinder is designed relative to the hub to be mounted to the shaft such that by securing them in one position the hub may be forced onto the shaft utilizing pressurized fluid and by securing the piston and the cylinder in another position the hub may be forced from the shaft using a pressurized fluid.

2 Claims, 1 Drawing Figure

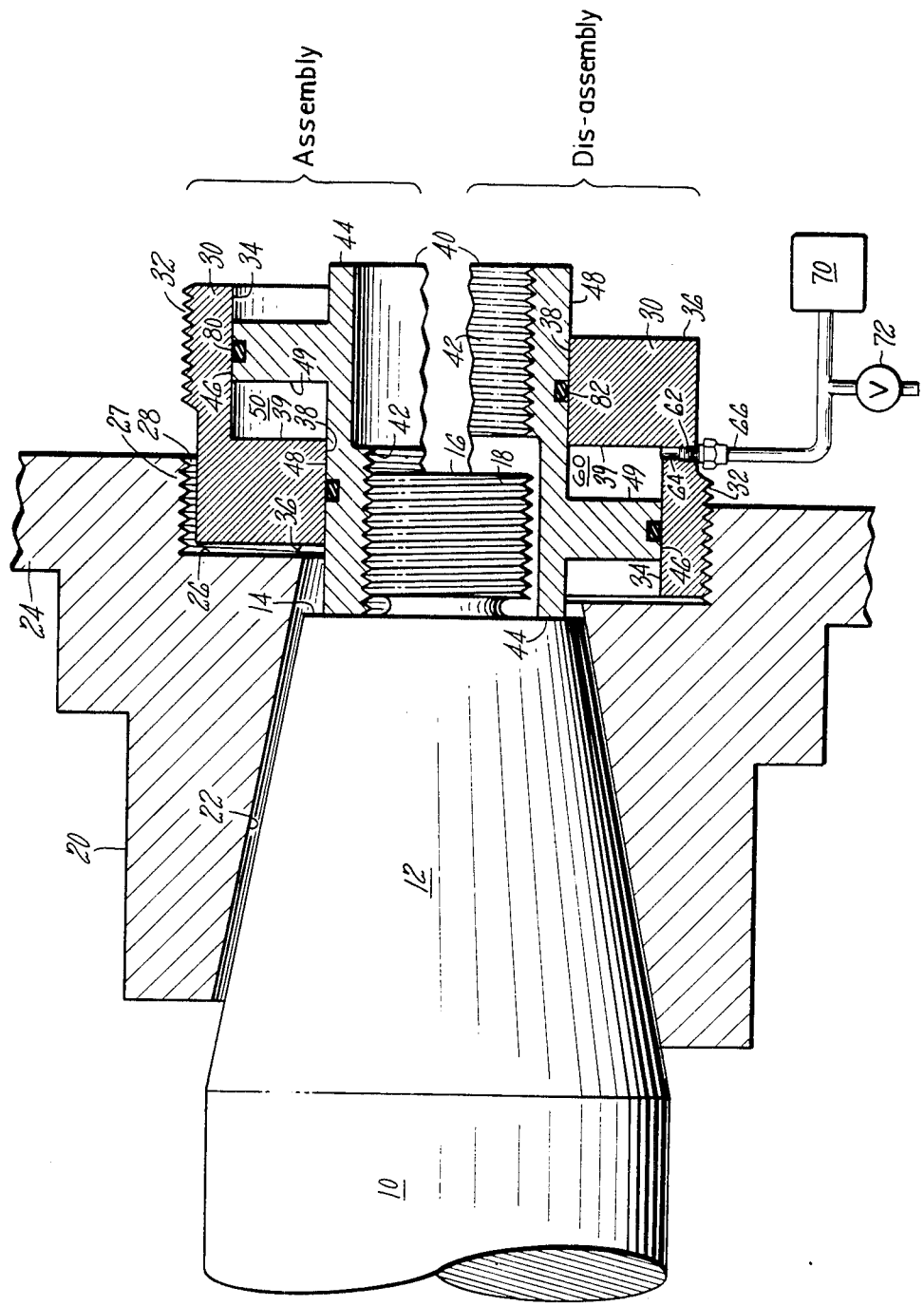

APPARATUS FOR MOUNTING AND REMOVING A HUB FROM A SHAFT

BACKGROUND OF THE INVENTION

This invention relates to a method and apparatus for mounting and removing a hub from a shaft. More specifically the invention concerns utilization of a cylinder and a piston provided in an arrangement that may be used in one orientation to force a hub on the shaft and in a separate orientation to remove the hub from the shaft.

In the rotary machine art it is common practice to move a hub of a coupling, impeller or the like onto a shaft over which the hub has been preliminarily applied or to displace a hub from such a mounted position. Numerous types of apparatus have been used to accomplish this function.

Typical of the prior art over which this idea is an improvement is U.S. Pat. No. 3,772,759. This prior art patent discloses a device wherein hydraulic fluid is supplied to expand a chamber to force a hub onto a shaft. Some means for securing the device relative to the shaft such that the expansion force may be used to force the hub onto the shaft is provided. However to use the same apparatus to remove the hub from the shaft requires additional structure for securing the expansion apparatus to the hub. As can be seen in this patent the additional structure includes longitudinally extending rods which are secured internally within the hub. These rods are connected to a separate structure against which the expansion portion must be mounted.

The herein device utilizes a cylinder and a piston which may be mounted in a first position with the cylinder secured to the shaft such that upon the application of pressurized fluid the piston is displaced forcing the hub on the shaft similar to the prior art. However to effect removal of the hub from the shaft the assembly is simply reversed and placed in the opposite direction with the cylinder abutting the shaft and with the piston threadably engaged on its exterior surface to an interior surface of the coupling. Pressurized fluid may then be supplied to the cavity to effect displacement of the hub to remove it from the shaft.

SUMMARY OF THE INVENTION

It is an object of the present invention to provide a method and apparatus for moving the hub of a coupling, wheel, propeller, impeller or the like into and out of a force fit position on a shaft.

It is a further object of the present invention to provide a simple two element apparatus which may be positioned in a first position to effect assembly of a hub to a shaft and a second position to effect removal of the hub from the shaft.

It is another object of the present invention to provide apparatus which may be used at the factory for assembly or in the field for maintenance purposes for easily assembling and disassembling a hub from a shaft.

It is a yet further object of the present invention to provide a combination cylinder and piston for effecting removal and assembly of a hub to a shaft without requiring additional components and without requiring that the hub be drilled and internally tapped to allow removal thereof.

It is a still further object of the present invention to provide a fast, relatively inexpensive and easy to use apparatus and method for effecting assembly and disassembly of a hub from a shaft.

Other objects will be apparent from the description to follow and the appended claims.

The above objects are achieved according to a preferred embodiment of the invention by the provision of an assembly for mounting and removing a hub from a shaft. The assembly serially includes, a tapered portion, a radially extending abutment face and a threaded end portion. A hub including a tapered portion which is complementary to the shaft tapered portion, a radially extending abutment face and an axially extending threaded portion is further included. An annular cylinder having a threaded portion for engaging the threaded end portion of the shaft when positioned for mounting the hub to the shaft, a contact face positioned to engage the shaft abutment face when the cylinder is positioned for removing the hub from the shaft, a first cylinder sliding surface and a second cylinder sliding surface is also disclosed. An annular piston having a first piston sliding surface and a second piston sliding surface each mating with the respective cylinder sliding surfaces to define a cavity therebetween, a piston threaded portion for engaging the coupling threaded portion when the piston is in position for removing the hub from the shaft, a cylinder contact face for engaging the coupling abutment face when the cylinder is in position for mounting the hub on the shaft, and said piston defines a conduit for supplying pressurized fluid to the cavity whereby when a pressurized fluid is supplied to the cavity and when the cylinder and the piston are in position for mounting the hub to the shaft cylinder, the cylinder is threadably secured to the shaft threaded end and the piston engages the hub forcing the hub on the shaft and if in position for removing the hub from the shaft, the cylinder contact face abuts the shaft abutment face and the cylinder is threadably engaged to the coupling such that by supplying pressurized fluid to the cavity, the hub is removed from the shaft.

An assembly for mounting and removing a hub from the shaft is further disclosed including cylinder means for engaging the shaft, and piston means for engaging the hub, said cylinder means and piston means together define a cavity for the receipt of pressurized fluid for forcing the cylinder means and the piston means in opposite directions to effect mounting or removing of the hub from the shaft by appropriate positioning of the cylinder means and the piston means.

DESCRIPTION OF THE DRAWING

The FIGURE is a sectional split view of the assembly shown in the top half with the components positioned to mount the hub to the shaft and in the bottom half with the components positioned to remove the hub from the shaft.

DESCRIPTION OF THE PREFERRED EMBODIMENT

The invention herein will be described with reference to a cylinder and a piston for mounting a tapered hub to a tapered shaft. It is to be understood, of course, that this apparatus could be used to mount a hub to a shaft of different configuration. It is additionally to be understood that his hub could be the hub of a coupling, a hub of an impeller or any similar structure which needs to be forced onto or off a shaft. Furthermore the hub and shaft could be keyed although not necessary and not shown.

As shown in the FIGURE the top half of the diagram shows the apparatus in position for assembling the hub to the shaft. The bottom half of the drawing shows the apparatus in position for removing the hub from the shaft. All the apparatus is annular in configuration and the sectional view shown in representative of the entire configuration.

Referring to the FIGURE it may be seen that the shaft 10 includes a shaft tapered portion 12, shaft abutment face 14 extending radially outward from the shaft axis and threaded end 16 including threads 18. Coupling hub 20 includes coupling tapered portion 22 which is complementary with the shaft tapered portion 12 such that they may be positioned in a force fit relationship. Coupling hub 20 further includes coupling extension 24 which would be that portion of the coupling which may be secured to an adjacent coupling, coupling abutment face 26 and coupling threaded portion 27 extending in an axial direction including coupling threads 28.

Piston 30 is an annular element having a generally L-shaped cross section and includes piston threads 32 formed on the exterior surface of the piston and extending radially outwardly. Piston 30 further includes a first piston sliding surface 34, a second piston sliding surface 38, piston contact face 36 and piston pressure face 39. Cylinder 40 is annular in configuration and also generally L-shaped in cross section. Cylinder 40 includes cylinder threads 42 extending inwardly through a bore extending the length of the cylinder. Cylinder 40 additionally includes cylinder contact face 44 shown abutting shaft abutment face 14, in the bottom half of the FIGURE. The cylinder also includes first cylinder sliding surface 46, second cylinder sliding surface 48 and pressure face 49. O rings 80 and 82 are shown mounted between the first cylinder sliding surface and the first piston sliding surface and the second piston sliding surface and the second cylinder surface to effect a seal therebetween. Assembly cavity 50 is shown at the top half of the drawing as a cavity defined between the sliding surfaces and the pressure faces of the piston and cylinder respectively. Disassembly cavity 60 is the same cavity shown in the bottom half of the drawing. Additionally as shown only in the bottom half of the drawing is tapped hole 62 extending into the piston and communicating with conduit 64. Conduit 66 may be threadably engaged to the tapped hole 62 for effectively supplying pressurized fluid to the cavity for effecting relative displacement between the cylinder and the piston to either mount or remove a hub from a shaft. Oil supply 70 is shown generically as a means for supplying pressurized fluid to the cavity. Valve 72 is shown for use in draining oil from the cavity.

METHOD OF OPERATION

To effect assembly of the hub to the shaft, the cylinder is mounted with cylinder threads 42 engaging threads 18 of the threaded end of the shaft. The piston 30 is positioned with the piston contact face engaging the coupling abutment face of the coupling. The coupling has, of course, been prepositioned on the shaft. Pressurized fluid is then supplied to the cavity 50 such that the fluid acts on piston pressure face 39, and cylinder pressure face 49 of cavity 50 to effect relative displacement between the two. Since the cylinder is secured to the shaft the piston is displaced as shown in the top half of the FIGURE from right to left forcing the coupling hub onto the shaft.

In order to effect removal of the coupling hub from the shaft the cylinder is threadably disengaged from the threaded end of the shaft. The cylinder is then physically flipped or rotated end-to-end and the opposite end of the cylinder is placed over the threaded end portion of the shaft but not in engagement therewith such that cylinder contact face 44 abuts shaft abutment face 14. Simultaneously, with the cylinder, the piston is rotated and is now also positioned in the opposite direction with the appropriate piston sliding surfaces engaging sliding surfaces of the cylinder. The piston is then threadably engaged to the coupling with piston external threads 32 engaging coupling threads 28 to secure the coupling to the piston. Pressurized fluid is then supplied to cavity 60 forcing the cylinder to the left and the piston to the right. However, since the cylinder abut against the shaft it cannot move to the left, therefore, the piston is displaced to the right. Since the piston is threadably engaged to the coupling the coupling is moved to the right removing the coupling hub from the shaft.

In the manner above described the apparatus as provided is utilized to effectively force the hub onto the shaft and to remove the hub from the shaft depending upon the manner of application of the apparatus. No special pressure plates, extending rods tapped into the hub or other apparatus is required to effect removal of the hub.

The invention has been described with reference to a particular embodiment. It is to be understood by those skilled in the art that variations and modifications can be effected within the spirit and scope of the invention.

I claim:

1. An assembly for mounting and removing a hub from a shaft which serially includes a tapered portion, a radially-extending abutment face and a threaded end portion, said hub including a tapered portion which is complementary to the shaft tapered portion, a radially-extending abutment face and an axially-extending threaded portion, said assembly comprising:

an annular cylinder having a threaded portion for engaging the threaded end portion of the shaft when positioned for mounting the hub to the shaft, a contact face positioned to engage the shaft abutment face when the cylinder is positioned for removing the hub from the shaft, a first cylinder sliding surface and a second cylinder sliding surface, said cylinder defining an axially extending center opening wherein the cylinder threaded portion extends inwardly from the cylinder towards the center opening and wherein the first and second cylinder sliding surfaces are annular and are positioned radially outwardly from the center opening and extend in an axial direction; and an annular piston having a first piston sliding surface and the second piston sliding surface each mating with the respective cylinder sliding surface to define a cavity between the piston and cylinder, a threaded portion on the piston for engaging the threaded portion of the hub when the piston is in position for removing the hub from the shaft, a cylinder contact face for engaging the abutment face of the shaft when the cylinder is in position for mounting the hub on the shaft, said piston defining a conduit for supplying pressurized fluid to the cavity, whereby if pressurized fluid is supplied to the cavity when the cylinder and piston are in position for mounting the hub to the shaft, the cylinder is threadably secured to the shaft threaded end portion, and then the piston engages the hub forcing the hub on the shaft and, if the cylinder and piston are in position for removing the hub from the shaft, the cylinder contact face abuts the shaft abutment face and the piston is threadly engaged to the hub such that by supplying pressurized fluid to the cavity the hub is removed from the shaft.

2. The apparatus as set forth in claim 1 further comprising first sealing means located between the first sliding surface of the piston and the first sliding surface of the cylinder and second sealing means located between the second sliding surface of the piston and the second sliding surface of the cylinder.

* * * * *